March 9, 1937. A. C. KAHN 2,073,373
TRAP
Original Filed March 28, 1923
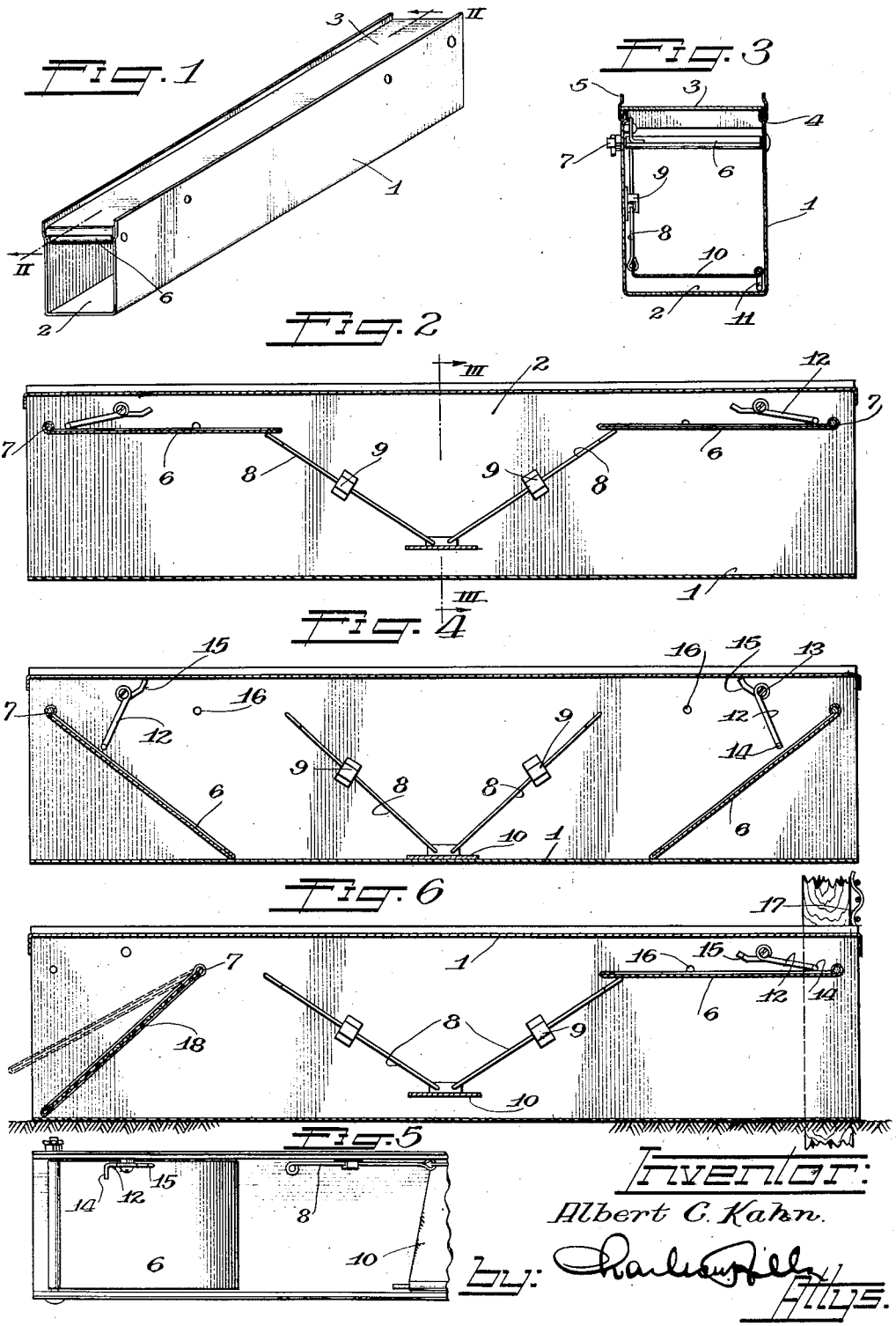
Inventor:
Albert C. Kahn.

Patented Mar. 9, 1937

2,073,373

UNITED STATES PATENT OFFICE 2,073,373

TRAP

Albert C. Kahn, Tomahawk, Wis.

Refiled for abandoned application Serial No. 265,355, March 28, 1928. This application April 20, 1936, Serial No. 75,500

4 Claims. (Cl. 43—61)

This application is filed in place of abandoned application No. 265,355, filed March 28, 1928.

This invention relates to improvements in traps and the like, and more particularly to the traps of the character adapted for the capturing of animals alive and uninjured, although the invention will have other and various uses as will be apparent to one skilled in the art.

Recent developments in the fur industry have created a comparatively great demand for the capture of fur-bearing animals, not for the purpose of removing the pelts therefrom, but for the purpose of keeping the animals alive and breeding the same. The animals are usually kept in a pen until they have sufficiently increased in number to permit the killing of a quantity of them for the sale of the resulting pelts. Obviously, therefore, breeders of fur-bearing animals desire only living undamaged specimens, preferably fence-broke.

In the past, traps and devices for the capturing of live fur-bearing animals have proved objectionable in most instances, in that the animal was injured thereby when caught or permitted to injure itself in an attempt to escape. Moreover, these formerly known traps, in most instances, permitted the entrance of a plurality of animals thereinto, in which event the animals would immediately fight with each other when caught, with resulting injury to one or all of them. Further, these traps, in many instances, were not as easily set or sprung as desired, necessitated the use of a lure, and were oftentimes rendered inoperable by frost, ice and the action of the elements.

The present invention has been designed to overcome the above noted defects and objections in the provision of a single animal trap which is exceedingly easily sprung, and which effectively prevents the entrance or retainment therein of more than one animal at a time.

The invention also seeks to provide a trap having a plurality of entrances thereinto from various directions, which entrances are adapted to be simultaneously closed and held against the reopening thereof by an animal either within or without the trap.

A further object of the present invention is to provide a trap which when sprung may be again set by simply turning the same through one complete revolution.

It is well-known that animals, especially those living near water, provide themselves with comparatively small runways to the water; and it is equally well-known that there are certain types of animals who will not pass around a hollow log, but will invariably pass through the same.

Accordingly, therefore, it is a further object of the present invention to provide a trap which, when set, has a straight passage completely therethrough and so may be placed in an animal runway, or camouflaged and positioned beside a log, and which does not necessitate the use of a lure.

While some of the more salient features, characteristics and advantages of a device embodying the present invention have been above pointed out, others will become apparent from the disclosures hereinafter.

The invention includes these and other features of construction and combinations of parts hereinafter described, and shown in a preferred form in the drawing, as more particularly indicated by the claims.

On the drawing:

Figure 1 is an isometric view of a device embodying features of the present invention.

Figure 2 is an enlarged vertical sectional view taken substantially along the line II—II of Figure 1.

Figure 3 is a transverse vertical sectional view taken substantially along the line III—III of Figure 2.

Figure 4 is a view similar to Figure 2, showing the device after the same has been sprung.

Figure 5 is a fragmentary top plan view of the device as shown in Figure 4, with the cover removed.

Figure 6 is a fragmentary sectional view similar to Figure 2, showing a modified use of the device.

As shown on the drawing:

In the illustrated embodiment of the present invention, there is shown a tubular casing 1 having an entrance in each end thereof and a continuous passage 2 therethrough. A cover 3 forms a part of the casing 1 but is removable from the remainder thereof, the sides of the casing being beaded, as indicated at 4 (Figure 3), so as to receive downwardly turned rims on each side of the cover therein. The side walls also project above the cover, as indicated at 5, which projecting portions may be bent over, if so desired, to firmly secure the cover.

Adjacent each end of the casing 1, an inwardly extending flap or drop closure 6 is pivotally mounted near its outer edge on a transverse bolt 7 extending through the casing, these parts being readily removable from the casing.

The flaps 6 are preferably longer than the casing is high so that, when these flaps are down, blocking passage into or out of the casing, the free ends of the flaps will rest upon the floor of the casing and they will be obliquely inclined (Figure 4).

When the trap is set, as shown more clearly in Figures 2 and 3, the flaps are retained in elevated or open position by a pair of upwardly diverging supporting rods 8 which are slidable in sleeves 9 fixed to a wall of the casing. The supporting rods 8, in this instance, are shown as made of wire having loops in the free ends thereof which abut the near ends of the flaps 6 to thereby support the same. The rods preferably have a relatively small amount of inherent resiliency for a purpose that will later appear.

The supporting rods are both pivotally connected adjacent their lower extremities to a trigger which, in this instance, is in the form of a tread plate 10, which plate is pivoted adjacent its opposite edge to a bracket 11 secured in any desired manner to the floor of the casing. The tread plate extends substantially entirely across the casing, preferably adjacent the center of the same, so that it will be relatively impossible for an animal or the like to pass through the casing without actuating the trigger.

Disposed above each of the flaps 6 is a stop member 12 pivoted adjacent one end thereof to a stud bolt 13 or the like in a wall of the casing 1, and actuated by gravity. When the flaps 6 drop, the stop members, due to being pivoted at their off-center portions, will also drop so that an inwardly turned portion 14 thereon will assume a position adjacent the flaps, as shown more clearly in Figure 4. On the other side of the fulcrum or pivot point, the stop members are each provided with a relatively short integral projecting portion 15 which will abut the top of the casing, so that the stop members as a whole effectively prevent the re-elevation of the flaps 6.

The operation of the present invention is extremely simple. Assuming the trap to be in sprung position as shown in Figure 4, and that it is desired to set the same, the casing 1 is merely inverted. The flaps 6 will thereupon assume positions adjacent the top of the casing or cover 3, due to the action of gravity. The members 12, due to the greater part of their weight being disposed to the right of their pivotal point, will also be gravity-actuated for preceding the movement of the flaps 6 to a position adjacent the top of the casing or cover, as best seen in Figures 2 and 6. The supporting rods 8 and tread plate 10 will also have a limited movement towards the top of the casing. Due to their weight and the resiliency of the supporting rods 8, the flaps 6 will pass by the tips of the supporting rods.

When the casing is again placed in its original position, the inner ends of the flaps 6 will rest upon the tips of the supporting rods 8 and counterbalance the same so that the tread plate 10 will be elevated from the floor of the casing 1, as seen clearly in Figure 2. The stop members 12 will, of course, merely rest upon the flaps 6, being much lighter than the flaps. When pressure is applied on the tread plate 10, due to the movement of an animal or by other means, the upper ends of the supporting rods 8 will be moved sufficiently to drop the flaps 6, the stop members 12 pivotally dropping therewith.

It is readily apparent, therefore, that an animal actuating the tread plate 10 would be immediately imprisoned within the casing 1, it not being possible for the animal to escape through the inclined flaps 6. The stop members 12 assuming their positions adjacent the inside edge portions of the flaps prevent the elevation of the flaps 6 by another animal or other means on the exterior of the casing, whereby only one animal may be imprisoned at a time. If animals follow each other in close single file, when one animal springs the trap, one of the flaps 6 will drop in such a manner as to bump the next adjacent animal on the head, thereby causing the latter animal to immediately back out of the casing. The imprisoned animal obtains a sufficient quantity of air through the spaces between the cover 3 and the pivot points of the flaps 6.

It should also be noted with regard to the present invention that the trap may be entered from either end thereof. Moreover, all of the working parts are sheltered and are preferably made of rust-proof material, whereby frost, ice and action of the elements will not affect the operation of the device, which may even be set in water. It should be noted that the side walls of the casing 1 are provided with aligned apertures 16 therein, similar to the apertures through which the bolts 7 pass but on the inner side thereof, for a purpose that will later appear.

In Figure 6, I have shown a modification in the use of the present invention. In this instance, the trap is shown positioned with one end thereof projecting through a fence or pen 17 in which animals may be retained for breeding or other purposes. To utilize the trap in this manner, the bolts 7 and the flaps 6 are removed from the inner end of the trap. A screen 18 is then pivoted to the bolt 7 which now passes through the apertures 16. The screen 18 is thereby inclined with its free end disposed towards the end of the casing, whereby it will be impossible for an animal to enter the trap from the inner end thereof, but an entrapped animal may readily pass out through the inner end of the trap into the pen by simply pushing against the screen 18 sufficiently to raise the same.

From the foregoing, it is apparent that I have provided a device for the capturing of live animals which will entrap only one animal at a time, keep the animal uninjured, and which is quick and positive in its action due to the counterbalanced mechanism therein. Moreover, the trap described herein affords a plurality of entrances thereto and is quickly and easily set by simply turning the same through one complete revolution. Further, the present invention is simple in construction and may be economically manufactured.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a device of the character described, a casing having a plurality of entrances thereto, means for blocking said entrances, means for retaining said first mentioned means in open position until actuated by pressure to release the same, and means operable with said first mentioned means for maintaining the same in closed position, all of said means being operable by gravity to assume their original position, whereby said device may be set by turning it over and then righting it.

2. In a trap, a casing having a plurality of entrances, a treadle in said casing, a plurality of upwardly diverging resilient arms on said treadle, and blocking means for said entrances resting upon said arms in open position when said trap is set, said means counterbalancing said treadle to keep the same elevated, the resiliency of said arms permitting said means to pass thereby when said trap is inverted after being sprung so that said trap will be set when again righted.

3. In a device of the character described, a casing having a plurality of entrances, members movably secured to said casing for blocking said entrances, a treadle in said casing, a plurality of rods having their lower ends connected to said treadle, said rods being outwardly slidable when said casing is inverted to engage said members for maintaining said members in an elevated position when said casing is righted.

4. In a device of the character described, a casing having a plurality of entrances, members secured to said casing for blocking said entrances, pivotal elements in said casing having one of their ends contacting with the top portion thereof and the other end of said elements positioned adjacent said members for preventing elevation of the same, said elements being pivotal out of the path of movement of said members when the casing is inverted, means for holding said members in an elevated position, and means for moving said last means so as to enable downward movement of said members.

ALBERT C. KAHN.